(12) United States Patent
Zhang

(10) Patent No.: US 11,733,483 B2
(45) Date of Patent: Aug. 22, 2023

(54) OPTICAL LENS ASSEMBLY AND IMAGING DEVICE INCLUDING SEVEN LENSES OF −+−++−+ OR −+−+−++ REFRACTIVE POWERS

(71) Applicant: Ningbo Sunny Automotive Optech Co., Ltd., Ningbo (CN)

(72) Inventor: Ye Zhang, Ningbo (CN)

(73) Assignee: Ningbo Sunny Automotive Optech Co., Ltd., Ningbo (CN)

( * ) Notice: Subject to any disclaimer, the term of this patent is extended or adjusted under 35 U.S.C. 154(b) by 281 days.

(21) Appl. No.: 16/919,594

(22) Filed: Jul. 2, 2020

(65) Prior Publication Data
US 2021/0003820 A1    Jan. 7, 2021

(30) Foreign Application Priority Data
Jul. 2, 2019    (CN) .......................... 201910596738.1

(51) Int. Cl.
G02B 9/64    (2006.01)
(52) U.S. Cl.
CPC ...................... G02B 9/64 (2013.01)
(58) Field of Classification Search
CPC ...................................................... G02B 9/64
See application file for complete search history.

(56) References Cited

U.S. PATENT DOCUMENTS

| 2013/0242414 A1 | 9/2013 | Iwamoto |
| 2013/0321936 A1 | 12/2013 | Ohashi |
| 2020/0012078 A1* | 1/2020 | Kuo ........................ G02B 9/64 |

FOREIGN PATENT DOCUMENTS

| CN | 203054330 U | 7/2013 |
| CN | 104969110 A | 10/2015 |
| CN | 109425958 A | 3/2019 |
| JP | 2014-56021 A | 3/2014 |

OTHER PUBLICATIONS

JP 2014056021 A, translation (Year: 2014).*
Communication dated Jun. 3, 2021 from The State Intellectual Property Office of the P.R. of China in Application No. 201910596738.1.

* cited by examiner

*Primary Examiner* — Wen Huang
(74) *Attorney, Agent, or Firm* — Sughrue Mion, PLLC

(57) ABSTRACT

An optical lens assembly and an imaging device including the optical lens assembly are disclosed. The optical lens assembly may include a first lens, a second lens, a third lens, a fourth lens, a fifth lens, a sixth lens, and a seventh lens sequentially from an object side to an image side along an optical axis. The first lens may have a negative refractive power with an image-side surface being concave. The second lens may have a positive refractive power with an object-side surface being convex. The third lens may have a negative refractive power with an object-side surface and an image-side surface being concave. The fourth lens may have a positive refractive power with an object-side surface and an image-side surface being convex. The seventh lens may have a positive refractive power with an object-side surface being convex.

16 Claims, 8 Drawing Sheets

OPTICAL LENS ASSEMBLY AND IMAGING DEVICE INCLUDING SEVEN LENSES OF −+−++−+ OR −+−+−++ REFRACTIVE POWERS

CROSS-REFERENCE TO RELATED APPLICATION

This application claims benefit of priority to Chinese Patent Application No. 201910596738.1 filed on Jul. 2, 2019 before the China National Intellectual Property Administration, the entire disclosure of which is incorporated herein by reference in its entity.

TECHNICAL FIELD

The present disclosure relates to an optical lens assembly and an imaging device including the same, and more particularly, to an optical lens assembly including seven lenses and an imaging device.

BACKGROUND

With the development of science and technology and the widespread application of high and new technologies, automobile assisted driving technology has gradually developed and matured, and the optical lens assembly is increasingly widely applied in automobiles.

Generally, the optical lens assembly used for general automotive applications are required to have high performance, while the optical lens assembly performance used for autonomous driving are required to have more excellent performance. The optical lens assembly used for autonomous driving needs to have better advantages in detection distance, resolution, and low-light performance.

Long-distance imaging requires an optical lens assembly with a long focal length, but a long focal length results in a long overall length of the lens assembly, which is not conducive to miniaturization of the lens assembly. At the same time, such optical lens assemblies require a larger aperture to enable them to have good imaging quality at night or in environments with relatively weak lighting conditions.

For an optical lens assembly applied to self-driving, the optical lens assembly is more needed to acquire and analyze an image in place of a human eye. Especially in harsh environments, it is particularly important that the optical lens assembly can maintain stable performance at different temperatures.

The whole industry now focuses on reducing costs, increasing resolution and increasing detection range. Therefore, there is a need in the market to develop an optical lens assembly having long focal length, miniaturization, low cost and high resolution, and which can be used in low light and harsh environments.

SUMMARY

The present disclosure provides an optical lens assembly that is applicable to on-board installation and at least overcomes or partially overcomes at least one of the above-mentioned deficiencies of the prior art.

One aspect of the present disclosure provides an optical lens assembly which may include a first lens, a second lens, a third lens, a fourth lens, a fifth lens, a sixth lens, and a seventh lens sequentially from an object side to an image side along an optical axis. The first lens may have a negative refractive power with an image-side surface being concave; the second lens may have a positive refractive power with an object-side surface being convex; the third lens may have a negative refractive power with an object-side surface and an image-side surface being concave; the fourth lens may have a positive refractive power with an object-side surface and an image-side surface being convex; and the seventh lens may have a positive refractive power with an object-side surface being convex.

Optionally, an object-side surface of the first lens may be convex or concave.

Optionally, an image-side surface of the second lens may be convex or concave.

Optionally, an image-side surface of the seventh lens may be convex or concave.

The fifth lens may have a positive refractive power, and each of an object-side surface and an image-side surface thereof may be convex; and the sixth lens may have a negative refractive power, and an object-side surface thereof may be concave and an image-side surface thereof may be convex. Alternatively, the fifth lens may have a negative refractive power, and the object-side surface thereof may be convex and the image-side surface thereof may be concave; and the sixth lens may have a positive refractive power, and each of the object-side surface and the image-side surface thereof may be convex.

The third lens and the fourth lens may be cemented to each other to form a first cemented lens.

The fifth lens and the sixth lens may be cemented to each other to form a second cemented lens.

A maximum field-of-view FOV of the optical lens assembly, a total focal length F of the optical lens assembly, and an image height H corresponding to the maximum field-of-view of the optical lens assembly may satisfy $(FOV \times F)/H \geq 45°$.

A maximum field-of-view FOV of the optical lens assembly, a maximum through aperture D of an object-side surface of the first lens corresponding to the maximum field-of-view of the optical lens assembly, and an image height H corresponding to the maximum field-of-view of the optical lens assembly may satisfy $D/H/FOV \leq 0.07$.

An optical total length TTL of the optical lens assembly and a total focal length F of the optical lens assembly may satisfy $TTL/F \leq 7$.

An optical back focal length BFL of the optical lens assembly and a lens group length TL of the optical lens assembly may satisfy $BFL/TL \geq 0.25$.

An entrance pupil diameter ENPD of the optical lens assembly and a total optical length TTL of the optical lens assembly may satisfy $ENPD/TTL \geq 0.05$.

A focal length F7 of the seventh lens and a total focal length F of the optical lens assembly may satisfy $F7/F \leq 4.5$.

A center distance d45 between the image-side surface of the fourth lens and an object-side surface of the fifth lens and an optical total length TTL of the optical lens assembly may satisfy $0.005 \leq d45/TTL \leq 0.035$.

A focal length F3 of the third lens and a focal length F4 of the fourth lens may satisfy $0.3 \leq |F3/F4| \leq 1.7$.

A focal length F2 of the second lens and a total focal length F of the optical lens assembly may satisfy $F2/F \leq 4.5$.

A center radius of curvature R2 of the image-side surface of the first lens and a center radius of curvature R3 of the object-side surface of the second lens may satisfy $|(R2-R3)/(R2+R3)| \leq 1.5$.

Another aspect of the present disclosure provides an optical lens assembly which may include a first lens, a second lens, a third lens, a fourth lens, a fifth lens, a sixth lens, and a seventh lens sequentially from an object side to an image side along an optical axis. Each of the first lens and the third lens may have a negative refractive power. Each of the second lens, the fourth lens and the seventh lens may have a positive refractive power. The third lens and the fourth lens may be cemented to each other to form a first cemented lens. The fifth lens and the sixth lens may be cemented to each other to form a second cemented lens. An optical total length TTL of the optical lens assembly and a total focal length F of the optical lens assembly may satisfy TTL/F≤7.

An object-side surface of the first lens may be convex and an image-side surface may be concave. Alternatively, both the object-side surface and the image-side surface of the first lens may be concave.

Both an object-side surface and an image-side surface of the second lens may be convex. Alternatively, the object-side surface of the second lens may be convex and the image-side surface thereof may be concave.

Both an object-side surface and an image-side surface of the third lens may be concave.

Both an object-side surface and an image-side surface of the fourth lens may be convex.

The fifth lens may have a positive refractive power, and both an object-side surface and an image-side surface thereof may be convex; and the sixth lens may have a negative refractive power, and an object-side surface thereof may be concave and an image-side surface thereof may be convex. Alternatively, the fifth lens may have a negative refractive power, and the object-side surface thereof may be convex and the image-side surface thereof may be concave; and the sixth lens may have a positive refractive power, and both the object-side surface and the image-side surface thereof may be convex.

Both an object-side surface and an image-side surface of the seventh lens may be convex. Alternatively, the object-side surface of the seventh lens may be convex and the image-side surface thereof may be concave.

A maximum field-of-view FOV of the optical lens assembly, the total focal length F of the optical lens assembly, and an image height H corresponding to the maximum field-of-view of the optical lens assembly may satisfy (FOV×F)/H≥45°.

A maximum field-of-view FOV of the optical lens assembly, a maximum through aperture D of an object-side surface of the first lens corresponding to the maximum field-of-view of the optical lens assembly, and an image height H corresponding to the maximum field-of-view of the optical lens assembly may satisfy D/H/FOV≤0.07.

An optical back focal length BFL of the optical lens assembly and a lens group length TL of the optical lens assembly may satisfy BFL/TL≥0.25.

An entrance pupil diameter ENPD of the optical lens assembly and a total optical length TTL of the optical lens assembly may satisfy ENPD/TTL≥0.05.

A focal length F7 of the seventh lens and the total focal length F of the optical lens assembly may satisfy F7/F≤4.5.

A center distance d45 between an image-side surface of the fourth lens and an object-side surface of the fifth lens and an optical total length TTL of the optical lens assembly may satisfy 0.005≤d45/TTL≤0.035.

A focal length F3 of the third lens and a focal length F4 of the fourth lens may satisfy 0.3≤|F3/F4|≤1.7.

A focal length F2 of the second lens and the total focal length F of the optical lens assembly may satisfy F2/F≤4.5.

A center radius of curvature R2 of an image-side surface of the first lens and a center radius of curvature R3 of an object-side surface of the second lens may satisfy |(R2−R3)/(R2+R3)|≤1.5.

Still another aspect of the present disclosure provides an imaging apparatus which may include an optical lens assembly according to the above-described embodiment and an imaging element for converting an optical image formed by the optical lens assembly into an electrical signal.

In the present disclosure, for example, seven lenses are used. By optimizing the shape of the lenses, rationally distributing the refractive power of each lens, forming a cemented lens, and the like, at least one of the beneficial effects such as high resolution, long focal length, miniaturization, large aperture, good temperature performance, large field-of-view angle, and low cost of an optical lens assembly is achieved.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

Figure 1:
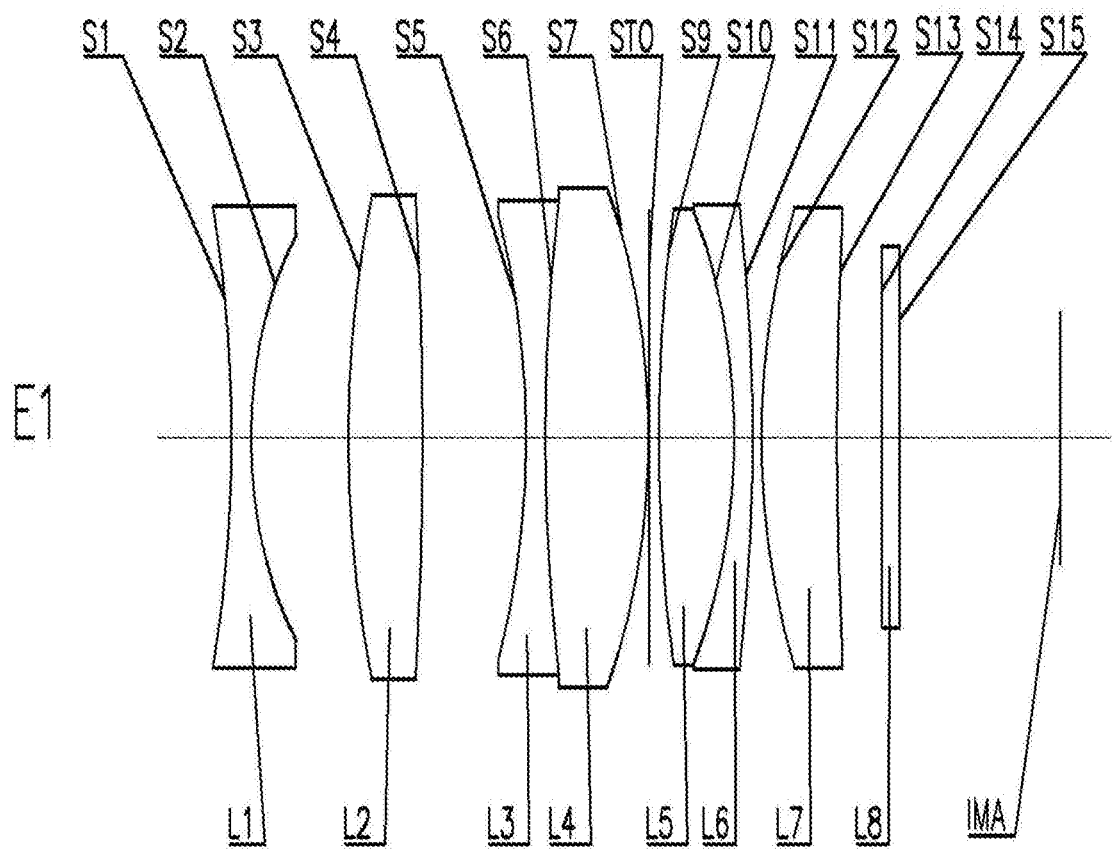
FIG. 1 is a schematic structural diagram showing an optical lens assembly according to Example 1 of the present disclosure.

For a better understanding of the present disclosure, various aspects of the present disclosure will be described in more detail with reference to the accompanying drawings. It should be understood that the detailed descriptions are merely used for describing exemplary embodiments of the present disclosure, but not intend to limit the scope of the present disclosure in any way. Throughout the specification, like reference numerals refer to like elements. The expression "and/or" includes any and all combinations of one or more of the associated listed items.

It should be noted that, in the present specification, the expressions such as first, second, third, etc., are merely used for distinguishing one feature from another feature without limiting the feature. Thus, a first lens discussed below may also be referred to as a second lens or a third lens, and a first cemented lens may also be referred to as a second cemented lens, without departing from the teachings of the present disclosure.

In the drawings, thicknesses, sizes and shapes of the lenses have been slightly exaggerated for ease of illustration. In particular, spherical or aspheric shapes shown in the drawings are shown by way of example. That is, spherical or aspheric shapes are not limited to the spherical or aspheric shapes shown in the drawings. The drawings are merely examples, and not strictly drawn to scale.

Herein, a paraxial region refers to the region near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave to at least in the paraxial region. The surface of each lens closest to the object is referred to as object-side surface, and the surface of each lens closest to the imaging plane is referred to as image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to an exemplary embodiment of the present disclosure includes, for example, seven lenses having refractive power, that is, a first lens, a second lens, a third lens, a fourth lens, a fifth lens, a sixth lens, and a seventh lens. The seven lenses are arranged sequentially along an optical axis from an object side to an image side.

The optical lens assembly according to an exemplary embodiment of the present disclosure may further include a photosensitive element disposed on an imaging plane. Alternatively, the photosensitive element provided on the imaging plane may be a Charge-Coupled Device element (CCD) or a Complementary Metal-Oxide Semiconductor element (CMOS).

The first lens may have a negative refractive power, its object-side surface may optionally be convex or concave, and its image-side surface may be concave. The first lens is provided with a negative refractive power, which can reduce the front end aperture and improve the imaging quality while avoiding excessive divergence of the light from the object side, thereby facilitating the control for the aperture of the rear lens. The object-side surface of the first lens may be a convex surface or a concave surface. If the object-side surface is a convex surface, it is advantageous to collect the light rays of the large field of view into the rear optical system as much as possible, increase the amount of light entered, and facilitate achieving the overall large field of view. In addition, the convex surface facilitates the lens to adapt the water drops in the outdoor use environment, such as severe weather such as rain and snow, and reduces the influence on imaging. If the object-side surface is a concave surface, it is advantageous to reduce the aperture of the front end of the lens, control the overall size of the lens, and increase the distortion moderately, which is applicable for the case where it is necessary to focus on magnifying and observing the front small-range scene.

The second lens may have a positive refractive power, its object-side surface may be convex, and its image-side surface may optionally be convex or concave. The second lens is arranged to have a positive refractive power, which converges the light and adjusts the light to smoothly transition to the rear. The object-side surface of the second lens is convex, so that the distance between the first lens and the second lens can be reduced, and the overall physical length of the lens can be reduced more easily, thereby realizing miniaturization.

The third lens may have a negative refractive power, and its object-side surface and image-side surface may be concave.

The fourth lens may have a positive refractive power, and its object-side surface and image-side surface may be convex.

The fifth lens may have a positive refractive power, and its object-side surface and image-side surface may be convex. Alternatively, the fifth lens may have a negative refractive power, its object-side surface may be convex and its image-side surface may be concave.

The sixth lens may have a negative refractive power, its object-side surface may be concave and its image-side surface may be convex. Alternatively, the sixth lens may have a positive refractive power, and its object-side surface and image-side surface may be convex.

The seventh lens may have a positive refractive power, its object-side surface may be convex, and its image-side surface optionally may be convex or concave. The seventh lens is arranged to have a positive refractive power, so that light rays can be converged efficiently and smoothly at the end, thereby facilitating reduction of the main ray angle CRA of the system, improving the quality of the image resolution, and making the lens assembly more suitable for use in a low-light environment.

In an exemplary embodiment, the optical lens assembly according to the present disclosure may further include a filter disposed between the seventh lens and the imaging plane to filter light having different wavelengths, as desired. Also, the optical lens assembly may further include a protective glass disposed between the filter and the imaging plane to prevent damage to an internal component (e.g., a chip) of the optical lens assembly.

As known to those skilled in the art, a cemented lens may be used to minimize or eliminate color aberrations. The use of a cemented lens in an optical lens assembly may improve the image quality and reduce the reflection losses of light energy, thereby improving the sharpness of the lens assembly. In addition, the use of a cemented lens may also simplify the assembly procedure in the lens assembly manufacturing process.

In an exemplary embodiment, the third lens and the fourth lens may be combined into a first cemented lens by cementing the image-side surface of the third lens and the object-side surface of the fourth lens. The cemented lens itself may self-extinction, reduce tolerance sensitivity, or may leave part of the color aberration to compensate the color aberration of the system. The omission of the air space between the two lenses makes the optical system compact, and advantageously satisfies the miniaturization requirement. At the same time, it is possible to reduce the tolerance sensitivity problem of the lens unit due to inclination/eccentricity and the like generated in the assembling process. In the first cemented lens, the negative lens (i.e., the third lens) is arranged in front, and the positive lens (i.e., the fourth lens) is arranged in rear, so that the light rays from the front can be diverged and then quickly converged and subsequently transferred to the rear, thereby facilitating the reduction of the optical path of the rear light rays to realize the short TTL.

In an exemplary embodiment, the fifth lens and the sixth lens may also be combined into a second cemented lens by cementing the image-side surface of the fifth lens with the object-side surface of the sixth lens. The second cemented lens is composed of a positive lens and a negative lens, wherein the negative lens can be in front or behind, which can enrich the diversity of system architecture. The use of a plurality of cemented lenses can effectively reduce the color aberrations of the system and improve the image quality. In addition, the overall structure of the optical system is compact, which satisfies miniaturization requirements, and simultaneously reduces tolerance sensitivity problems such as inclination/eccentricity caused by the lens unit in the assembling process. In addition, the cemented lens can reduce the loss of light amount caused by reflection between the lenses and improve the illuminance. It is also possible to further reduce the field curvature and correct the off-axis point aberration of the system.

The use of the first cemented lens and the second cemented lens not only facilitates correction of aberrations, achieves high resolution of images, makes the overall structure of the optical system compact, and meets miniaturization requirements, but also reduces the tolerance sensitivity problem of the lens unit due to inclination/eccentricity and the like generated in the assembling process.

In an exemplary embodiment, a stop for limiting the light beam may be provided between, for example, the fourth lens and the fifth lens to further improve the imaging quality of the lens. It will be appreciated that in the presence of the first and second cemented lenses, a stop may be disposed between the first and second cemented lenses. When the stop is disposed between the fourth lens and the fifth lens, it is advantageous to increase the aperture of the stop to meet the night vision requirement. However, it should be noted that the position of the stop disclosed herein is by way of example only and not limitation. In an alternative embodiment, the stop may also be provided in other positions as desired.

In an exemplary embodiment, a maximum field-of-view FOV of the optical lens assembly, a total focal length F of the optical lens assembly, and an image height H corresponding to the maximum field-of-view of the optical lens assembly may satisfy $(FOV \times F)/H \geq 45°$, and more desirable, may further satisfy $(FOV \times F)/H \geq 50°$. Satisfying the condition expression $(FOV \times F)/H \geq 45°$ may realize a large angle resolution, which is beneficial to take into account both the large field-of-view angle and the telephoto, and achieve medium and long range imaging.

In an exemplary embodiment, a maximum field-of-view FOV of the optical lens assembly, a maximum through aperture D of the object-side surface of the first lens corresponding to the maximum field-of-view of the optical lens assembly, and an image height H corresponding to the maximum field-of-view of the optical lens assembly may satisfy $D/H/FOV \leq 0.07$, and more desirable, may further satisfy $D/H/FOV \leq 0.05$. By satisfying the condition expression $D/H/FOV \leq 0.07$, the diameter of the front end can be ensured to be small, and miniaturization can be realized.

In an exemplary embodiment, an optical total length TTL of the optical lens assembly and a total focal length F of the optical lens assembly may satisfy $TTL/F \leq 7$, and more desirable, may further satisfy $TTL/F \leq 6.5$. By satisfying the condition expression $TTL/F \leq 7$, the miniaturization characteristic of the system can be ensured.

In an exemplary embodiment, an optical back focal length BFL of the optical lens assembly and a lens group length TL of the optical lens assembly may satisfy $BFL/TL \geq 0.25$, and more desirable, may further satisfy $BFL/TL \geq 0.27$. By satisfying the condition expression $BFL/TL \geq 0.25$, the back focal length can be achieved on the basis of miniaturization, which is advantageous for the assembly of optical lens.

In an exemplary embodiment, an entrance pupil diameter ENPD of the optical lens assembly and an optical total length TTL of the optical lens assembly may satisfy $ENPD/TTL \geq 0.05$, and more desirable, may further satisfy $ENPD/TTL \geq 0.1$. By satisfying the condition expression $ENPD/TTL \geq 0.05$, a large relative aperture can be achieved, and the clarity of the imaged image can be ensured even in a low-light environment or at night.

In an exemplary embodiment, a focal length F7 of the seventh lens and a total focal length F of the optical lens assembly may satisfy $F7/F \leq 4.5$, and more desirable, may further satisfy $F7/F \leq 4$. The last lens, the seventh lens, is arranged to have a short focal length, helping to collect light and ensuring the amount of light transmitted.

In an exemplary embodiment, a center distance d45 between the image-side surface of the fourth lens and the object-side surface of the fifth lens and an optical total length TTL of the optical lens assembly may satisfy $0.005 \leq d45/TTL \leq 0.035$, and more desirable, may further satisfy $0.008 \leq d45/TTL \leq 0.03$. By satisfying the condition expression $0.005 \leq d45/TTL \leq 0.035$, the center distance between two adjacent cemented lenses can be controlled. By controlling the lower limit, the smooth transition of light is facilitated, and the image resolution quality is improved. By controlling the upper limit, the overall length of the lens assembly is advantageously controlled, and miniaturization is realized.

In an exemplary embodiment, a focal length F3 of the third lens and a focal length F4 of the fourth lens may satisfy $0.3 \leq |F3/F4| \leq 1.7$, and more desirable, may further satisfy $0.5 \leq |F3/F4| \leq 1.5$. By arranging the focal lengths of the two adjacent lenses to be similar, smooth light transition can be facilitated, and image resolution quality can be improved.

In an exemplary embodiment, a focal length F2 of the second lens and a total focal length F of the optical lens assembly may satisfy $F2/F \leq 4.5$, and more desirable, may further satisfy $F2/F \leq 4$. By controlling the focal length of the second lens, the optical path of light rays from the first lens to the third lens is controlled, so that the structure of the lens assembly can be compact, thereby facilitating miniaturization.

In an exemplary embodiment, a center radius of curvature R2 of the image-side surface of the first lens and a center radius of curvature R3 of the object-side surface of the second lens may satisfy $|(R2-R3)/(R2+R3)| \leq 1.5$, and more desirable, may further satisfy $|(R2-R3)/(R2+R3)| \leq 1$. By satisfying the condition expression $|(R2-R3)/(R2+R3)| \leq 1.5$, the aberration of the optical system can be corrected, and the incident light is ensured to be relatively smooth when the light emitted from the first lens is incident on the first surface (i.e., object-side surface) of the second lens, thereby reducing the tolerance sensitivity of the optical system.

In an exemplary embodiment, the optical lens assembly according to the present disclosure may employ a spherical lens or an aspherical lens. Aspheric lenses are characterized by a continuous change in curvature from the center of the lens to the periphery. Unlike spherical lenses, which have a constant curvature from the center of the lens to the periphery, aspheric lenses have better radius of curvature characteristics and have the advantages of improving distortion and astigmatic aberration. With the aspheric lens, aberrations occurring during imaging can be eliminated as much as possible, thereby improving the imaging quality of the lens. It will be appreciated that the number of spherical or aspheric lenses may be appropriately increased as desired in a particular field of use.

In an exemplary embodiment, the optical lens assembly according to the present disclosure may employ a plastic lens or a glass lens. Generally, the coefficient of thermal expansion of the lens made of the plastic material is large, and when the ambient temperature of the lens changes greatly, the plastic lens will cause a large change in the optical back focal length of the lens. Using lenses made of glass material may reduce the effect on the optical back focal length of the lens assembly caused by temperature, but the cost is high. It will be appreciated that all-glass lenses may be employed to ensure stability of optical properties at different temperatures while focusing on temperature performance. Glass-plastic combination, or even all-plastic lenses, can be used to reduce costs while focusing on costs.

In the optical lens assembly according to the above-described embodiment of the present disclosure, seven lenses are used, and by optimizing the shape of the lenses and rationally distributing the refractive power, the focal length becomes longer and the overall length is shorter. The optical lens assembly has a relatively large relative aperture, has a good imaging effect, and has a high-definition image quality, thereby ensuring clarity of an imaging image even in a low-light environment or at night. The optical lens assembly adopts all-glass lens to ensure that perfect imaging clarity is maintained over a certain temperature range. The optical lens assembly employs two cemented lenses, which effectively reduces the chromatic aberration of the system, and makes the overall structure of the optical system compact. Therefore, the optical lens assembly according to the above-described embodiment of the present disclosure can better meet requirements of, for example, in-vehicle applications. In addition, the optical lens assembly according to the present disclosure can be used in the field of lidar, for example, and can realize a large field of view angle on the basis of realizing advantages such as telephoto, large aperture, and miniaturization.

It will be appreciated by those skilled in the art that the optical total length TTL of the optical lens assembly used above refers to an axial distance from a center of the object-side surface of the first lens to a center of the imaging plane. The optical back focal length BFL of the optical lens assembly refers to an axial distance from a center of the image-side surface of the last lens, the seventh lens, to the center of the imaging plane. Further, the lens group length TL of the optical lens assembly refers to an axial distance from the center of the object-side surface of the first lens to the center of the image-side surface of the last lens, the seventh lens.

However, it will be appreciated by those skilled in the art that the number of lenses constituting the lens may be varied without departing from the claimed technical solution of the present disclosure to obtain the various results and advantages described in this specification. For example, although seven lenses have been described in the embodiment, the optical lens assembly is not limited to include seven lenses. If desired, the optical lens assembly may also include other numbers of lenses.

Specific embodiments of an optical lens assembly applicable to the above-described embodiments are further described below with reference to the accompanying drawings.

Example 1

An optical lens assembly according to Example 1 of the present disclosure is described below with reference to FIG. 1. FIG. 1 shows a schematic structural diagram of the optical lens assembly according to Example 1 of the present disclosure.

As shown in FIG. 1, the optical lens assembly includes a first lens L1, a second lens L2, a third lens L3, a fourth lens L4, a fifth lens L5, a sixth lens L6, and a seventh lens L7, which are sequentially arranged along an optical axis from an object side to an imaging side of the optical lens assembly.

The first lens L1 is a biconcave lens having a negative refractive power, and both an object-side surface S1 and an image-side surface S2 thereof are concave.

The second lens L2 is a biconvex lens having a positive refractive power, and both an object-side surface S3 and an image-side surface S4 thereof are convex.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a biconvex lens having a positive refractive power, and both an object-side surface S9 and an image-side surface S10 thereof are convex. The sixth lens L6 is a meniscus lens having a negative refractive power, and an object-side surface S10 thereof is concave and an image-side surface S11 thereof is convex. The fifth lens L5 and the sixth lens L6 are cemented to each other to form a second cemented lens.

The seventh lens L7 is a meniscus lens having a positive refractive power, and an object-side surface S12 thereof is convex and an image-side surface S13 thereof is concave.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 1 shows the radius of curvature R, the thickness T (it should be understood that $T_1$ is a center thickness of the first lens L1, $T_2$ is an air gap between the first lens L1 and the second lens L2, and so on), the refractive index Nd, and the Abbe number Vd of each lens of the optical lens assembly of Example 1, wherein the radius of curvature R and the thickness T are both in units of millimeters (mm).

TABLE 1

| Surface No. | Radius of curvature R | Thickness T | Refractive index Nd | Abbe number Vd |
|---|---|---|---|---|
| 1 | −20.0000 | 1.0000 | 1.52 | 64.21 |
| 2 | 8.5417 | 5.1355 | | |
| 3 | 20.6835 | 4.0000 | 1.77 | 49.61 |
| 4 | −64.4634 | 5.4571 | | |
| 5 | −15.1445 | 1.0000 | 1.78 | 25.72 |
| 6 | 32.3875 | 5.5000 | 1.77 | 49.61 |
| 7 | −13.3224 | 0.0000 | | |
| STO | Infinite | 0.6000 | | |
| 9 | 27.4717 | 4.0000 | 1.50 | 81.59 |
| 10 | −15.0000 | 1.0000 | 1.78 | 25.72 |
| 11 | −33.9850 | 0.4188 | | |
| 12 | 13.8104 | 4.0000 | 1.77 | 49.61 |
| 13 | 35.0000 | 1.0000 | | |
| 14 | Infinite | 0.9500 | 1.52 | 64.21 |
| 15 | Infinite | 9.3616 | | |
| IMA | Infinite | / | | |

In the present embodiment, seven lenses are used as an example. The lens assembly has at least one of the advantages of high resolution, long focal length, miniaturization, large aperture, good temperature performance, large field-of-view angle, low cost, and the like, by rationally distributing the refractive power and the shape of each lens, the center thickness of each lens, and the air gap between each lens.

Table 2 below shows the maximum field-of-view FOV of the optical lens assembly, the total focal length F of the optical lens assembly, the image height H corresponding to the maximum field-of-view of the optical lens assembly, the total optical length TTL of the optical lens assembly (i.e., the axial distance from the center of the object-side surface S1 of the first lens L1 to the imaging plane IMA), the maximum through aperture D of the object-side surface S1 of the first lens L1 corresponding to the maximum field-of-view of the optical lens assembly, the optical back focal length BFL of the optical lens assembly (i.e., the axial distance from the center of the image-side surface S13 of the last lens, the seventh lens L7, to the imaging plane IMA), the lens group length TL of the optical lens assembly (i.e., the axial distance from the center of the object-side surface S1 of the first lens L1 to the center of the image-side surface S13 of the last lens, the seventh lens L7), the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 1.

TABLE 2

| FOV (°) | 60 | d45 (mm) | 0.6000 |
|---|---|---|---|
| F (mm) | 7.9230 | F3 (mm) | −13.4504 |
| H (mm) | 7.3120 | F4 (mm) | 13.1242 |
| TTL (mm) | 43.4229 | F2 (mm) | 21.0686 |
| D (mm) | 13.6977 | R2 (mm) | 8.5417 |
| BFL (mm) | 11.3116 | R3 (mm) | 20.6835 |
| TL (mm) | 32.1113 | | |
| ENPD (mm) | 6.3384 | | |
| F7 (mm) | 27.8052 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=65.104°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.031. The optical total length TTL of the optical lens assembly and the total focal length F of the optical lens assembly satisfy TTL/F=5.481. The optical back focal length BFL of the optical lens assembly and the lens group length TL of the optical lens assembly satisfy BFL/TL=0.352. The entrance pupil diameter ENPD of the optical lens assembly and the optical total length TTL of the optical lens assembly satisfy ENPD/TTL=0.146. The focal length F7 of the seventh lens L7 and the total focal length F of the optical lens assembly satisfy F7/F=3.509. The center distance d45 between the image-side surface S7 of the fourth lens L4 and the object-side surface S9 of the fifth lens L5 and the optical total length TTL of the optical lens assembly satisfy d45/TTL=0.014. The focal length F3 of the third lens L3 and the focal length F4 of the fourth lens L4 satisfy |F3/F4|=1.025. The focal length F2 of the second lens L2 and the total focal length F of the optical lens assembly satisfy F2/F=2.659. The center radius of curvature R2 of the image-side surface S2 of the first lens L1 and the center radius of curvature R3 of the object-side surface S3 of the second lens L2 satisfy |(R2−R3)/(R2+R3)|=0.415.

Example 2

Figure 2:
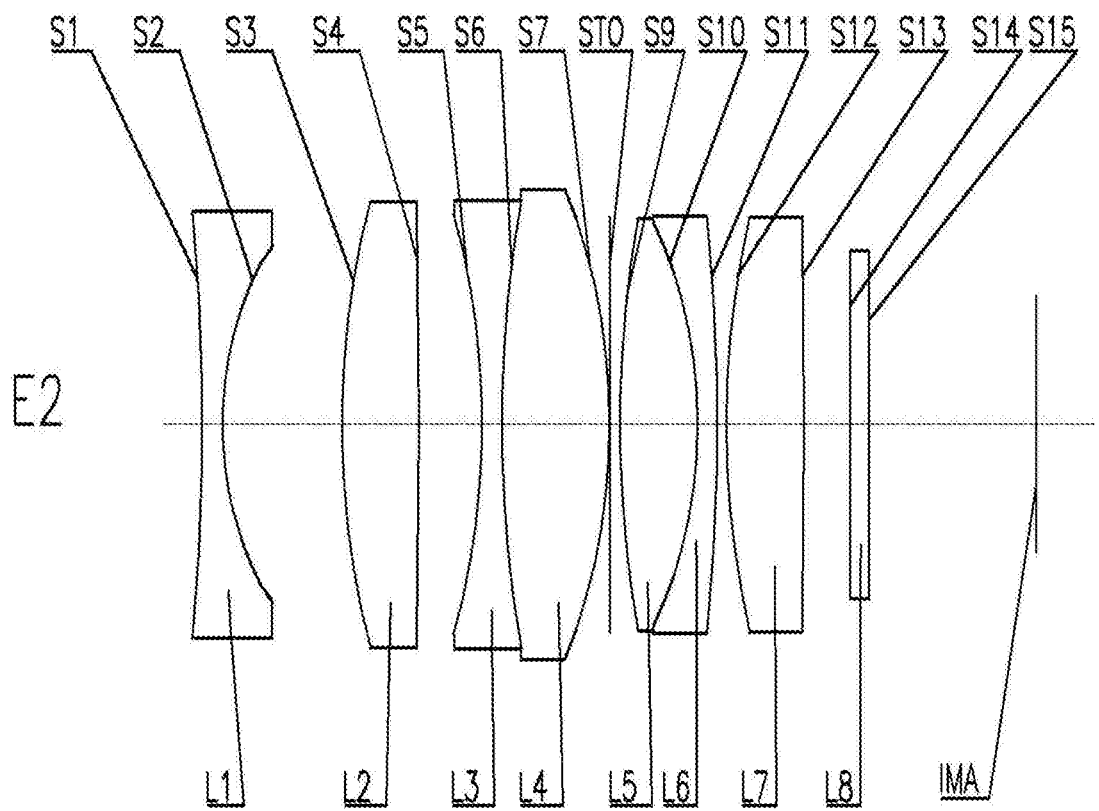
FIG. 2 is a schematic structural diagram showing an optical lens assembly according to Example 2 of the present disclosure.

An optical lens assembly according to Example 2 of the present disclosure is described below with reference to FIG. 2. In the present example and the following examples, a description similar to Example 1 will be omitted for brevity. FIG. 2 shows a schematic structural diagram of the optical lens assembly according to Example 2 of the present disclosure.

As shown in FIG. 2, the optical lens assembly includes a first lens L1, a second lens L2, a third lens L3, a fourth lens L4, a fifth lens L5, a sixth lens L6, and a seventh lens L7, which are sequentially arranged along an optical axis from an object side to an imaging side of the optical lens assembly.

The first lens L1 is a biconcave lens having a negative refractive power, and both an object-side surface S1 and an image-side surface S2 thereof are concave.

The second lens L2 is a biconvex lens having a positive refractive power, and both an object-side surface S3 and an image-side surface S4 thereof are convex.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a biconvex lens having a positive refractive power, and both an object-side surface S9 and an image-side surface S10 thereof are convex. The sixth lens L6 is a meniscus lens having a negative refractive power, and an object-side surface S10 thereof is concave and an image-side surface S11 thereof is convex. The fifth lens L5 and the sixth lens L6 are cemented to each other to form a second cemented lens.

The seventh lens L7 is a biconvex lens having a positive refractive power, and both an object-side surface S12 and an image-side surface S13 thereof are convex.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 3 below shows the radius of curvature R, the thickness T, the refractive index Nd, and the Abbe number Vd of each lens of the optical lens assembly of Example 2, wherein the radius of curvature R and the thickness T are both in units of millimeters (mm). Table 4 below shows the maximum field-of-view FOV of the optical lens assembly, the total focal length F of the optical lens assembly, the image height H corresponding to the maximum field-of-view of the optical lens assembly, the total optical length TTL of the optical lens assembly, the maximum through aperture D of the object-side surface S1 of the first lens L1 corresponding to the maximum field-of-view of the optical lens assembly, the optical back focal length BFL of the optical lens assembly, the lens group length TL of the optical lens assembly, the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 2.

TABLE 3

| Surface No. | Radius of curvature R | Thickness T | Refractive index Nd | Abbe number Vd |
|---|---|---|---|---|
| 1 | −80.0000 | 1.0000 | 1.52 | 64.21 |
| 2 | 7.2944 | 5.1068 | | |
| 3 | 17.3387 | 3.9500 | 1.77 | 49.61 |
| 4 | −100.0000 | 5.2190 | | |
| 5 | −15.3089 | 1.0000 | 1.78 | 25.72 |
| 6 | 35.0000 | 5.0000 | 1.77 | 49.61 |
| 7 | −12.7699 | 0.0000 | | |
| STO | Infinite | 0.5868 | | |
| 9 | 22.4789 | 5.0000 | 1.50 | 81.59 |
| 10 | −9.0000 | 1.0000 | 1.78 | 25.72 |
| 11 | −40.6598 | 0.4514 | | |
| 12 | 17.8350 | 4.0000 | 1.77 | 49.61 |
| 13 | −50.0000 | 1.0000 | | |
| 14 | Infinite | 0.9500 | 1.52 | 64.21 |

TABLE 3-continued

| Surface No. | Radius of curvature R | Thickness T | Refractive index Nd | Abbe number Vd |
|---|---|---|---|---|
| 15 | Infinite | 8.0766 | | |
| IMA | Infinite | / | | |

TABLE 4

| | | | |
|---|---|---|---|
| FOV (°) | 60 | d45 (mm) | 0.5868 |
| F (mm) | 7.9350 | F3 (mm) | −13.8891 |
| H (mm) | 7.6520 | F4 (mm) | 12.9164 |
| TTL (mm) | 42.3405 | F2 (mm) | 19.7653 |
| D (mm) | 14.6166 | R2 (mm) | 7.2944 |
| BFL (mm) | 10.0266 | R3 (mm) | 17.3387 |
| TL (mm) | 32.3140 | | |
| ENPD (mm) | 6.3480 | | |
| F7 (mm) | 17.7809 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=62.219°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.032. The optical total length TTL of the optical lens assembly and the total focal length F of the optical lens assembly satisfy TTL/F=5.336. The optical back focal length BFL of the optical lens assembly and the lens group length TL of the optical lens assembly satisfy BFL/TL=0.310. The entrance pupil diameter ENPD of the optical lens assembly and the optical total length TTL of the optical lens assembly satisfy ENPD/TTL=0.150. The focal length F7 of the seventh lens L7 and the total focal length F of the optical lens assembly satisfy F7/F=2.241. The center distance d45 between the image-side surface S7 of the fourth lens L4 and the object-side surface S9 of the fifth lens L5 and the optical total length TTL of the optical lens assembly satisfy d45/TTL=0.014. The focal length F3 of the third lens L3 and the focal length F4 of the fourth lens L4 satisfy |F3/F4|=1.075. The focal length F2 of the second lens L2 and the total focal length F of the optical lens assembly satisfy F2/F=2.491. The center radius of curvature R2 of the image-side surface S2 of the first lens L1 and the center radius of curvature R3 of the object-side surface S3 of the second lens L2 satisfy |(R2−R3)/(R2+R3)|=0.408.

Example 3

Figure 3:
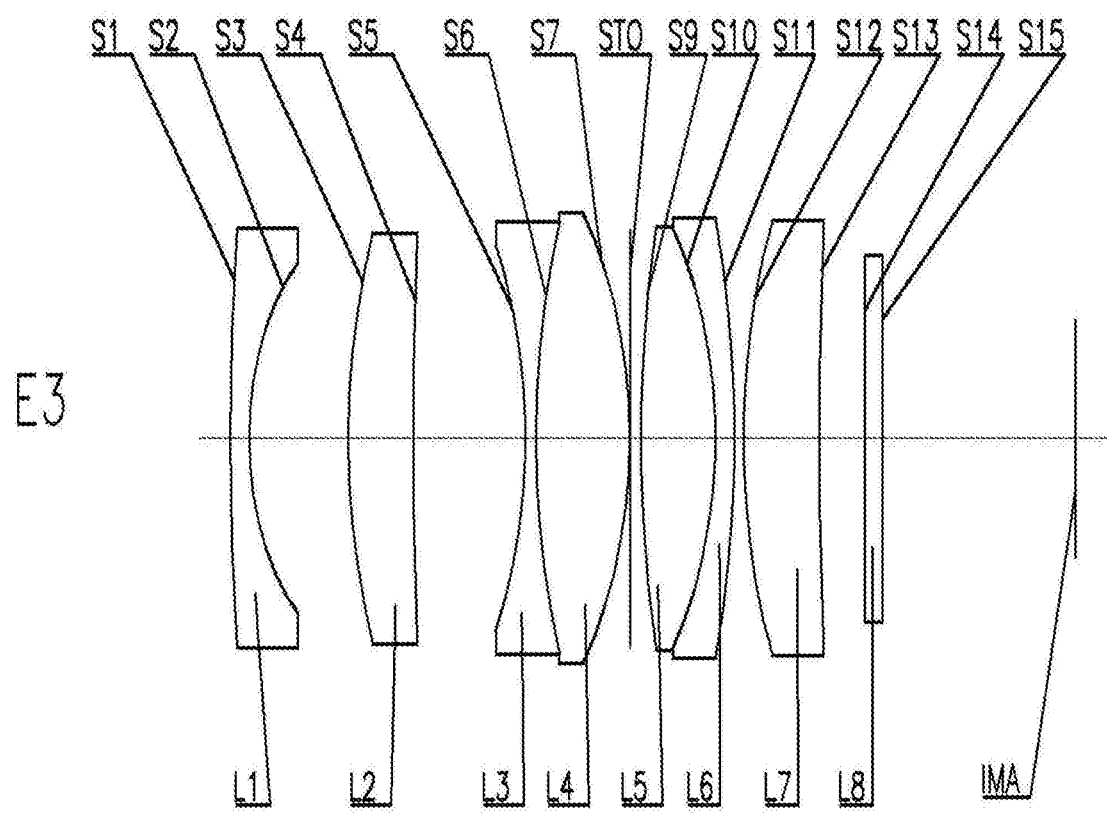
FIG. 3 is a schematic structural diagram showing an optical lens assembly according to Example 3 of the present disclosure.

An optical lens assembly according to Example 3 of the present disclosure is described below with reference to FIG. 3. In the present example and the following examples, a description similar to Example 1 will be omitted for brevity. FIG. 3 shows a schematic structural diagram of the optical lens assembly according to Example 3 of the present disclosure.

As shown in FIG. 3, the optical lens assembly includes a first lens L1, a second lens L2, a third lens L3, a fourth lens L4, a fifth lens L5, a sixth lens L6, and a seventh lens L7, which are arranged sequentially along an optical axis from an object side to an imaging side of the optical lens assembly.

The first lens L1 is a meniscus lens having a negative refractive power, and an object-side surface S1 thereof is convex and an image-side surface S2 thereof is concave.

The second lens L2 is a meniscus lens having a positive refractive power, and an object-side surface S3 thereof is convex and an image-side surface S4 thereof is concave.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a biconvex lens having a positive refractive power, and both an object-side surface S9 and an image-side surface S10 thereof are convex. The sixth lens L6 is a meniscus lens having a negative refractive power, and an object-side surface S10 thereof is concave and an image-side surface S11 thereof is convex. The fifth lens L5 and the sixth lens L6 are cemented to each other to form a second cemented lens.

The seventh lens L7 is a meniscus lens having a positive refractive power, and an object-side surface S12 thereof is convex and an image-side surface S13 thereof is concave.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 5 below shows the radius of curvature R, the thickness T, the refractive index Nd, and the Abbe number Vd of each lens of the optical lens assembly of Example 3, wherein the radius of curvature R and the thickness T are both in units of millimeters (mm). Table 6 below shows the maximum field-of-view FOV of the optical lens assembly, the total focal length F of the optical lens assembly, the image height H corresponding to the maximum field-of-view of the optical lens assembly, the total optical length TTL of the optical lens assembly, the maximum through aperture D of the object-side surface S1 of the first lens L1 corresponding to the maximum field-of-view of the optical lens assembly, the optical back focal length BFL of the optical lens assembly, the lens group length TL of the optical lens assembly, the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 3.

TABLE 5

| Surface No. | Radius of curvature R | Thickness T | Refractive index Nd | Abbe number Vd |
|---|---|---|---|---|
| 1 | 50.0000 | 1.0000 | 1.77 | 49.61 |
| 2 | 7.1885 | 5.1817 | | |
| 3 | 16.6795 | 4.0000 | 1.77 | 49.61 |
| 4 | 86.0961 | 4.9852 | | |
| 5 | −12.3478 | 0.5000 | 1.78 | 25.72 |
| 6 | 30.0000 | 5.0000 | 1.77 | 49.61 |
| 7 | −11.3416 | 0.0000 | | |
| STO | Infinite | 0.6000 | | |
| 9 | 28.2707 | 4.0000 | 1.50 | 81.59 |
| 10 | −12.0000 | 1.0000 | 1.78 | 25.72 |
| 11 | −23.9830 | 0.4188 | | |
| 12 | 16.1068 | 4.0000 | 1.77 | 49.61 |
| 13 | 50.0000 | 1.0000 | | |
| 14 | Infinite | 0.9500 | 1.52 | 64.21 |
| 15 | Infinite | 11.0011 | | |
| IMA | Infinite | / | | |

TABLE 6

| FOV (°) | 60 | d45 (mm) | 0.6000 |
|---|---|---|---|
| F (mm) | 7.8762 | F3 (mm) | −11.4469 |
| H (mm) | 7.7380 | F4 (mm) | 11.4460 |
| TTL (mm) | 43.6367 | F2 (mm) | 26.6082 |
| D (mm) | 13.5658 | R2 (mm) | 7.1885 |
| BFL (mm) | 12.9511 | R3 (mm) | 16.6795 |
| TL (mm) | 30.6857 | | |
| ENPD (mm) | 6.0586 | | |
| F7 (mm) | 29.8040 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=61.072°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.029. The optical total length TTL of the optical lens assembly and the total focal length F of the optical lens assembly satisfy TTL/F=5.540. The optical back focal length BFL of the optical lens assembly and the lens group length TL of the optical lens assembly satisfy BFL/TL=0.422. The entrance pupil diameter ENPD of the optical lens assembly and the optical total length TTL of the optical lens assembly satisfy ENPD/TTL=0.139. The focal length F7 of the seventh lens L7 and the total focal length F of the optical lens assembly satisfy F7/F=3.784. The center distance d45 between the image-side surface S7 of the fourth lens L4 and the object-side surface S9 of the fifth lens L5 and the optical total length TTL of the optical lens assembly satisfy d45/TTL=0.014. The focal length F3 of the third lens L3 and the focal length F4 of the fourth lens L4 satisfy |F3/F4|=1.000. The focal length F2 of the second lens L2 and the total focal length F of the optical lens assembly satisfy F2/F=3.378. The center radius of curvature R2 of the image-side surface S2 of the first lens L1 and the center radius of curvature R3 of the object-side surface S3 of the second lens L2 satisfy |(R2−R3)/(R2+R3)|=0.398.

Example 4

An optical lens assembly according to Example 4 of the present disclosure is described below with reference to FIG. 4. In the present example and the following examples, a description similar to Example 1 will be omitted for brevity.

Figure 4:
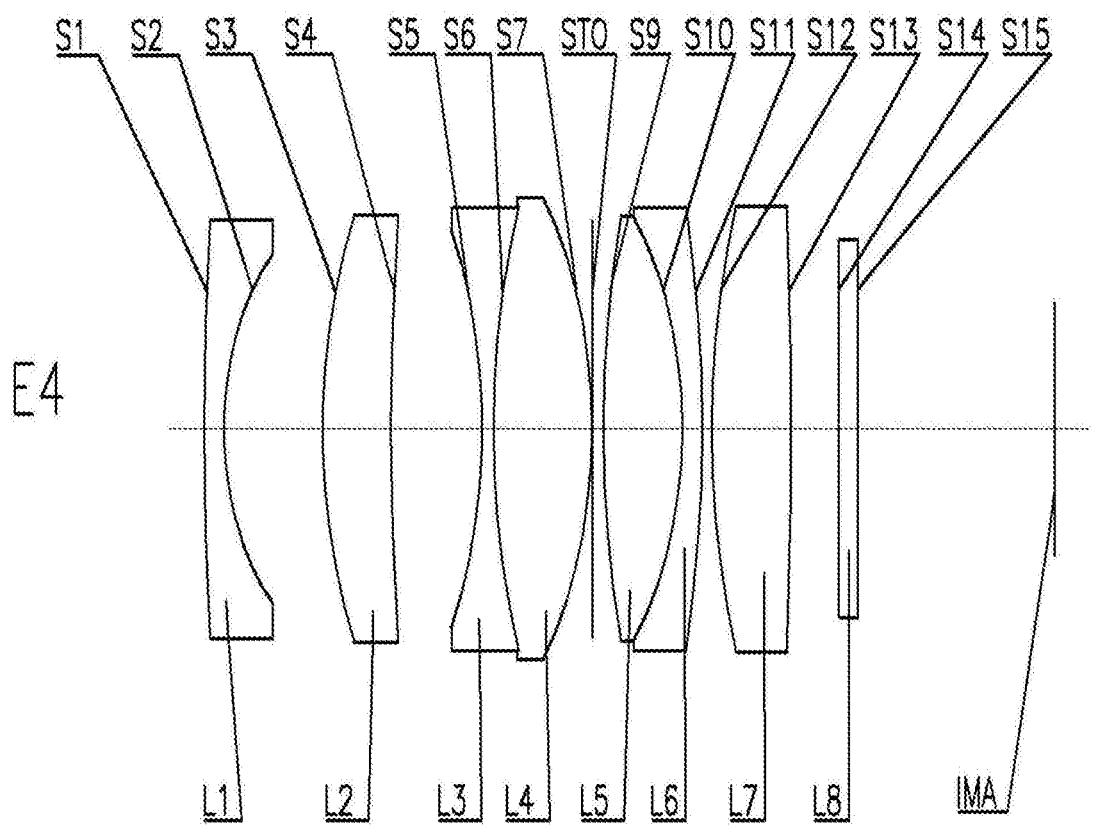
FIG. 4 is a schematic structural diagram showing an optical lens assembly according to Example 4 of the present disclosure.

FIG. 4 shows a schematic structural diagram of the optical lens assembly according to Example 4 of the present disclosure.

As shown in FIG. 4, the optical lens assembly includes a first lens L1, a second lens L2, a third lens L3, a fourth lens L4, a fifth lens L5, a sixth lens L6, and a seventh lens L7, which are arranged sequentially along an optical axis from an object side to an imaging side of the optical lens assembly.

The first lens L1 is a meniscus lens having a negative refractive power, and an object-side surface S1 thereof is convex and an image-side surface S2 thereof is concave.

The second lens L2 is a meniscus lens having a positive refractive power, and an object-side surface S3 thereof is convex and an image-side surface S4 thereof is concave.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a biconvex lens having a positive refractive power, and both an object-side surface S9 and an image-side surface S10 thereof are convex. The sixth lens L6 is a meniscus lens having a negative refractive power, and an object-side surface S10 thereof is concave and an image-side surface S11 thereof is convex. The fifth lens L5 and the sixth lens L6 are cemented to each other to form a second cemented lens.

The seventh lens L7 is a biconvex lens having a positive refractive power, and both an object-side surface S12 and an image-side surface S13 thereof are convex.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 7 below shows the radius of curvature R, the thickness T, the refractive index Nd, and the Abbe number Vd of each lens of the optical lens assembly of Example 4, wherein the radius of curvature R and the thickness T are both in units of millimeters (mm). Table 8 below shows the maximum field-of-view FOV of the optical lens assembly, the total focal length F of the optical lens assembly, the image height H corresponding to the maximum field-of-view of the optical lens assembly, the total optical length TTL of the optical lens assembly, the maximum through aperture D of the object-side surface S1 of the first lens L1 corresponding to the maximum field-of-view of the optical lens assembly, the optical back focal length BFL of the optical lens assembly, the lens group length TL of the optical lens assembly, the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 4.

TABLE 7

| Surface No. | Radius of curvature R | Thickness T | Refractive index Nd | Abbe number Vd |
|---|---|---|---|---|
| 1 | 30.0000 | 1.0000 | 1.77 | 49.61 |
| 2 | 6.8699 | 4.9018 | | |
| 3 | 13.8293 | 4.0000 | 1.78 | 25.71 |
| 4 | 56.7000 | 5.6072 | | |
| 5 | −12.4583 | 0.5000 | 1.85 | 23.82 |
| 6 | 30.0000 | 5.0000 | 1.77 | 49.61 |
| 7 | −11.1002 | 0.0000 | | |
| STO | Infinite | 0.6598 | | |
| 9 | 23.6346 | 4.0000 | 1.50 | 81.59 |
| 10 | −11.0000 | 1.0000 | 1.78 | 25.72 |
| 11 | −27.3981 | 0.4357 | | |
| 12 | 20.0015 | 4.0000 | 1.77 | 49.61 |
| 13 | −100.0000 | 1.0000 | | |
| 14 | Infinite | 0.9500 | 1.52 | 64.21 |
| 15 | Infinite | 9.9579 | | |
| IMA | Infinite | / | | |

TABLE 8

| FOV (°) | 60 | d45 (mm) | 0.6598 |
|---|---|---|---|
| F (mm) | 7.6425 | F3 (mm) | −10.6987 |
| H (mm) | 7.4200 | F4 (mm) | 11.2718 |
| TTL (mm) | 43.0123 | F2 (mm) | 23.1256 |
| D (mm) | 13.6358 | R2 (mm) | 6.8699 |
| BFL (mm) | 11.9079 | R3 (mm) | 13.8293 |
| TL (mm) | 31.1044 | | |
| ENPD (mm) | 5.8789 | | |
| F7 (mm) | 22.2916 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=61.799°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.031. The optical total length TTL of the optical lens assembly and the total focal length F of the optical lens assembly satisfy TTL/F=5.628. The optical back focal length BFL of the optical lens assembly and the lens group length TL of the optical lens assembly satisfy BFL/TL=0.383. The entrance pupil diameter ENPD of the optical lens assembly and the optical total length TTL of the optical lens assembly satisfy ENPD/TTL=0.137. The focal length F7 of the seventh lens L7 and the total focal length F of the optical lens assembly satisfy F7/F=2.917. The center distance d45 between the image-side surface S7 of the fourth lens L4 and the object-side surface S9 of the fifth lens L5 and the optical total length TTL of the optical lens assembly satisfy d45/TTL=0.015. The focal length F3 of the third lens L3 and the focal length F4 of the fourth lens L4 satisfy |F3/F4|=0.949. The focal length F2 of the second lens L2 and the total focal length F of the optical lens assembly satisfy F2/F=3.026. The center radius of curvature R2 of the image-side surface S2 of the first lens L1 and the center radius of curvature R3 of the object-side surface S3 of the second lens L2 satisfy |(R2−R3)/(R2+R3)|=0.336.

Example 5

An optical lens assembly according to Example 5 of the present disclosure is described below with reference to FIG.

Figure 5:
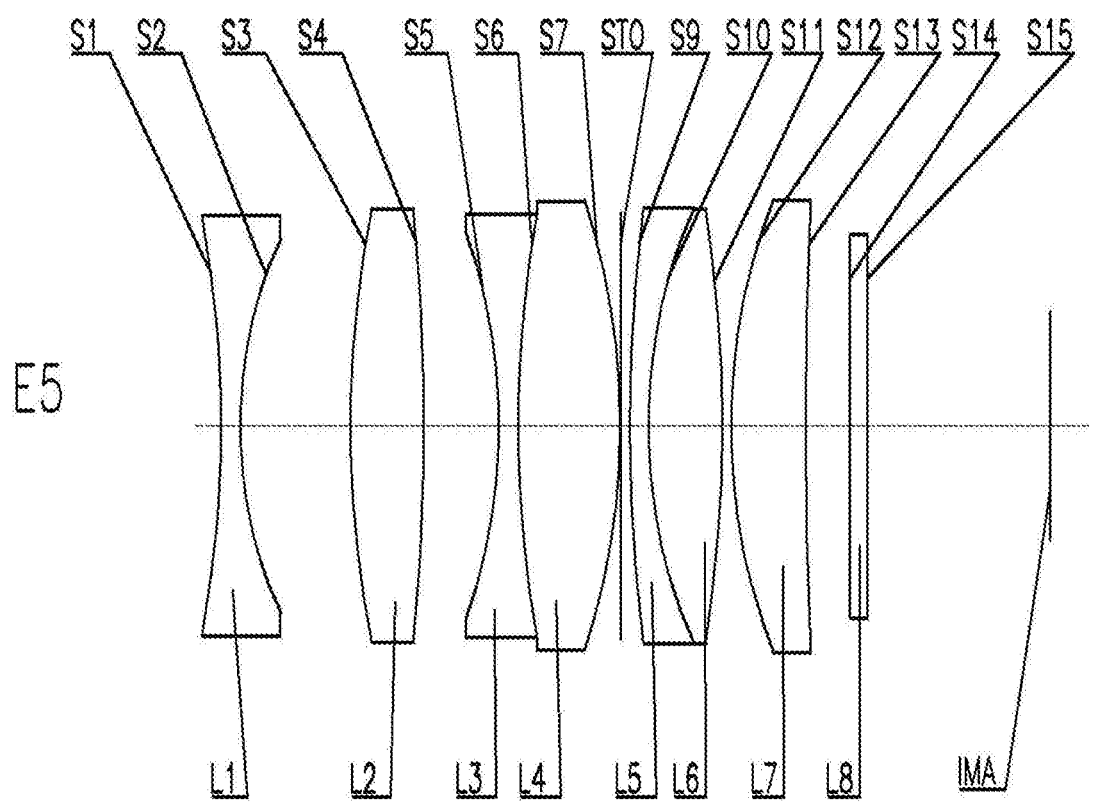
FIG. 5 is a schematic structural diagram showing an optical lens assembly according to Example 5 of the present disclosure.

5. In the present example and the following examples, a description similar to Example 1 will be omitted for brevity. FIG. 5 shows a schematic structural diagram of the optical lens assembly according to Example 5 of the present disclosure.

As shown in FIG. 5, the optical lens assembly includes a first lens L1, a second lens L2, a third lens L3, a fourth lens L4, a fifth lens L5, a sixth lens L6, and a seventh lens L7, which are arranged sequentially along an optical axis from an object side to an imaging side of the optical lens assembly.

The first lens L1 is a biconcave lens having a negative refractive power, and both an object-side surface S1 and an image-side surface S2 thereof are concave.

The second lens L2 is a biconvex lens having a positive refractive power, and both an object-side surface S3 and an image-side surface S4 thereof are convex.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a meniscus lens having a negative refractive power, and an object-side surface S9 thereof is convex and an image-side surface S10 thereof is concave. The sixth lens L6 is a biconvex lens having a positive refractive power, and both an object-side surface S10 and an image-side surface S11 thereof are convex. The fifth lens L5 and the sixth lens L6 are cemented to each other to form a second cemented lens.

The seventh lens L7 is a meniscus lens having a positive refractive power, and an object-side surface S12 thereof is convex and an image-side surface S13 thereof is concave.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 9 below shows the radius of curvature R, the thickness T, the refractive index Nd, and the Abbe number Vd of each lens of the optical lens assembly of Example 5, wherein the radius of curvature R and the thickness T are both in units of millimeters (mm). Table 10 below shows the maximum field-of-view FOV of the optical lens assembly, the total focal length F of the optical lens assembly, the image height H corresponding to the maximum field-of-view of the optical lens assembly, the total optical length TTL of the optical lens assembly, the maximum through aperture D of the object-side surface S1 of the first lens L1 corresponding to the maximum field-of-view of the optical lens assembly, the optical back focal length BFL of the optical lens assembly, the lens group length TL of the optical lens assembly, the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 5.

TABLE 9

| Surface No. | Radius of curvature R | Thickness T | Refractive index Nd | Abbe number Vd |
|---|---|---|---|---|
| 1 | −50.0000 | 1.0000 | 1.77 | 49.61 |
| 2 | 9.3603 | 4.9181 | | |
| 3 | 21.8406 | 3.9500 | 1.77 | 49.61 |
| 4 | −44.4222 | 4.0145 | | |
| 5 | −11.7852 | 1.0000 | 1.78 | 25.72 |
| 6 | 25.0000 | 5.0000 | 1.77 | 49.61 |
| 7 | −14.4315 | 0.0000 | | |
| STO | Infinite | 0.6297 | | |
| 9 | 34.0000 | 1.0000 | 1.78 | 25.72 |
| 10 | 15.0000 | 4.0000 | 1.50 | 81.59 |
| 11 | −27.3009 | 0.3819 | | |
| 12 | 12.9190 | 4.0000 | 1.77 | 49.61 |
| 13 | 50.0000 | 1.0000 | | |
| 14 | Infinite | 0.9500 | 1.52 | 64.21 |
| 15 | Infinite | 11.5162 | | |
| IMA | Infinite | / | | |

TABLE 10

| FOV (°) | 60 | d45 (mm) | 0.6297 |
|---|---|---|---|
| F (mm) | 7.8264 | F3 (mm) | −10.4125 |
| H (mm) | 7.5700 | F4 (mm) | 12.7589 |
| TTL (mm) | 43.3605 | F2 (mm) | 19.8100 |
| D (mm) | 13.2994 | R2 (mm) | 9.3603 |
| BFL (mm) | 13.4662 | R3 (mm) | 21.8406 |
| TL (mm) | 29.8943 | | |
| ENPD (mm) | 6.2611 | | |
| F7 (mm) | 21.9416 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=62.032°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.029. The optical total length TTL of the optical lens assembly and the total focal length F of the optical lens assembly satisfy TTL/F=5.540. The optical back focal length BFL of the optical lens assembly and the lens group length TL of the optical lens assembly satisfy BFL/TL=0.450. The entrance pupil diameter ENPD of the optical lens assembly and the optical total length TTL of the optical lens assembly satisfy ENPD/TTL=0.144. The focal length F7 of the seventh lens L7 and the total focal length F of the optical lens assembly satisfy F7/F=2.804. The center distance d45 between the image-side surface S7 of the fourth lens L4 and the object-side surface S9 of the fifth lens L5 and the optical total length TTL of the optical lens assembly satisfy d45/TTL=0.015. The focal length F3 of the third lens L3 and the focal length F4 of the fourth lens L4 satisfy |F3/F4|=0.816. The focal length F2 of the second lens L2 and the total focal length F of the optical lens assembly satisfy F2/F=2.531. The center radius of curvature R2 of the image-side surface S2 of the first lens L1 and the center radius of curvature R3 of the object-side surface S3 of the second lens L2 satisfy |(R2−R3)/(R2+R3)|=0.400.

Example 6

Figure 6:
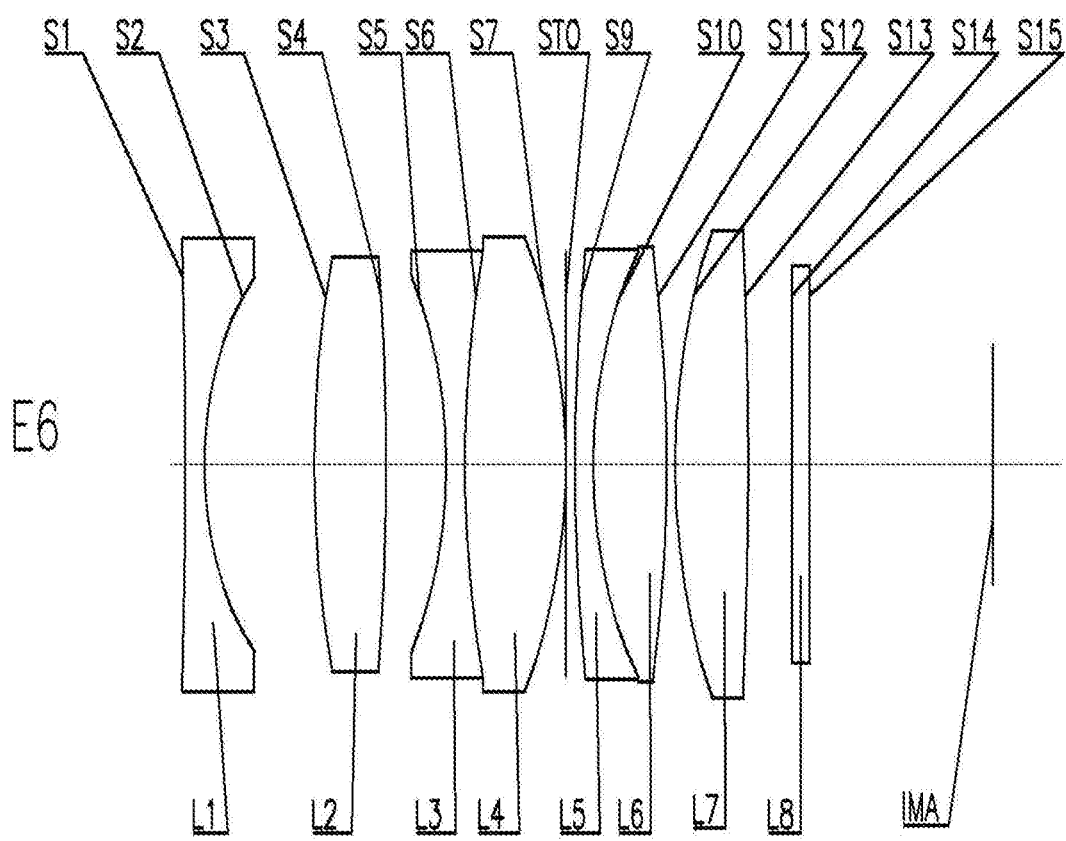
FIG. 6 is a schematic structural diagram showing an optical lens assembly according to Example 6 of the present disclosure.

An optical lens assembly according to Example 6 of the present disclosure is described below with reference to FIG. 6. In the present example and the following examples, a description similar to Example 1 will be omitted for brevity. FIG. 6 shows a schematic structural diagram of the optical lens assembly according to Example 6 of the present disclosure.

As shown in FIG. 6, the optical lens assembly includes a first lens L1, a second lens L2, a third lens L3, a fourth lens L4, a fifth lens L5, a sixth lens L6, and a seventh lens L7, which are arranged sequentially along an optical axis from an object side to an imaging side of the optical lens assembly.

The first lens L1 is a biconcave lens having a negative refractive power, and both an object-side surface S1 and an image-side surface S2 thereof are concave.

The second lens L2 is a biconvex lens having a positive refractive power, and both an object-side surface S3 and an image-side surface S4 thereof are convex.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a meniscus lens having a negative refractive power, and an object-side surface S9 thereof is convex and an image-side surface S10 thereof is concave. The sixth lens L6 is a biconvex lens having a positive refractive power, and both an object-side surface S10 and an image-side surface S11 thereof are convex. The fifth lens L5 and the sixth lens L6 are cemented to each other to form a second cemented lens.

The seventh lens L7 is a biconvex lens having a positive refractive power, and both an object-side surface S12 and an image-side surface S13 thereof are convex.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 11 below shows the radius of curvature R, the thickness T, the refractive index Nd, and the Abbe number Vd of each lens of the optical lens assembly of Example 6, wherein the radius of curvature R and the thickness T are each in units of millimeters (mm). Table 12 below shows the maximum field-of-view FOV of the optical lens assembly, the total focal length F of the optical lens assembly, the image height H corresponding to the maximum field-of-view of the optical lens assembly, the total optical length TTL of the optical lens assembly, the maximum through aperture D of the object-side surface S1 of the first lens L1 corresponding to the maximum field-of-view of the optical lens assembly, the optical back focal length BFL of the optical lens assembly, the lens group length TL of the optical lens assembly, the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 6.

TABLE 11

| Surface No. | Radius of curvature R | Thickness T | Refractive index Nd | Abbe number Vd |
|---|---|---|---|---|
| 1 | −100.0000 | 1.0000 | 1.77 | 49.61 |
| 2 | 7.7350 | 4.9640 | | |
| 3 | 22.1948 | 3.5000 | 1.77 | 49.61 |
| 4 | −50.1329 | 3.1524 | | |
| 5 | −10.3375 | 1.0000 | 1.78 | 25.72 |
| 6 | 40.0000 | 4.5000 | 1.77 | 49.61 |
| 7 | −12.6082 | 0.0000 | | |
| STO | Infinite | 0.6365 | | |
| 9 | 40.0000 | 1.0000 | 1.78 | 25.72 |
| 10 | 15.0000 | 4.0000 | 1.50 | 81.59 |
| 11 | −30.8791 | 0.2624 | | |
| 12 | 18.0000 | 4.0000 | 1.77 | 49.61 |
| 13 | −100.0000 | 1.0000 | | |
| 14 | Infinite | 0.9500 | 1.52 | 64.21 |
| 15 | Infinite | 13.7341 | | |
| IMA | Infinite | / | | |

TABLE 12

| | | | |
|---|---|---|---|
| FOV (°) | 60 | d45 (mm) | 0.6365 |
| F (mm) | 7.8713 | F3 (mm) | −10.7125 |
| H (mm) | 7.6640 | F4 (mm) | 13.1209 |
| TTL (mm) | 43.6995 | F2 (mm) | 20.7113 |
| D (mm) | 12.4019 | R2 (mm) | 7.7350 |
| BFL (mm) | 15.6841 | R3 (mm) | 22.1948 |
| TL (mm) | 28.0154 | | |
| ENPD (mm) | 6.0548 | | |
| F7 (mm) | 20.4062 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=61.623°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.027. The optical total length TTL of the optical lens assembly and the total focal length F of the optical lens assembly satisfy TTL/F=5.552. The optical back focal length BFL of the optical lens assembly and the lens group length TL of the optical lens assembly satisfy BFL/TL=0.560. The entrance pupil diameter ENPD of the optical lens assembly and the optical total length TTL of the optical lens assembly satisfy ENPD/TTL=0.139. The focal length F7 of the seventh lens L7 and the total focal length F of the optical lens assembly satisfy F7/F=2.592. The center distance d45 between the image-side surface S7 of the fourth lens L4 and the object-side surface S9 of the fifth lens L5 and the optical total length TTL of the optical lens assembly satisfy d45/TTL=0.015. The focal length F3 of the third lens L3 and the focal length F4 of the fourth lens L4 satisfy |F3/F4|=0.816. The focal length F2 of the second lens L2 and the total focal length F of the optical lens assembly satisfy F2/F=2.631. The center radius of curvature R2 of the image-side surface S2 of the first lens L1 and the center radius of curvature R3 of the object-side surface S3 of the second lens L2 satisfy |(R2−R3)/(R2+R3)|=0.483.

Example 7

Figure 7:
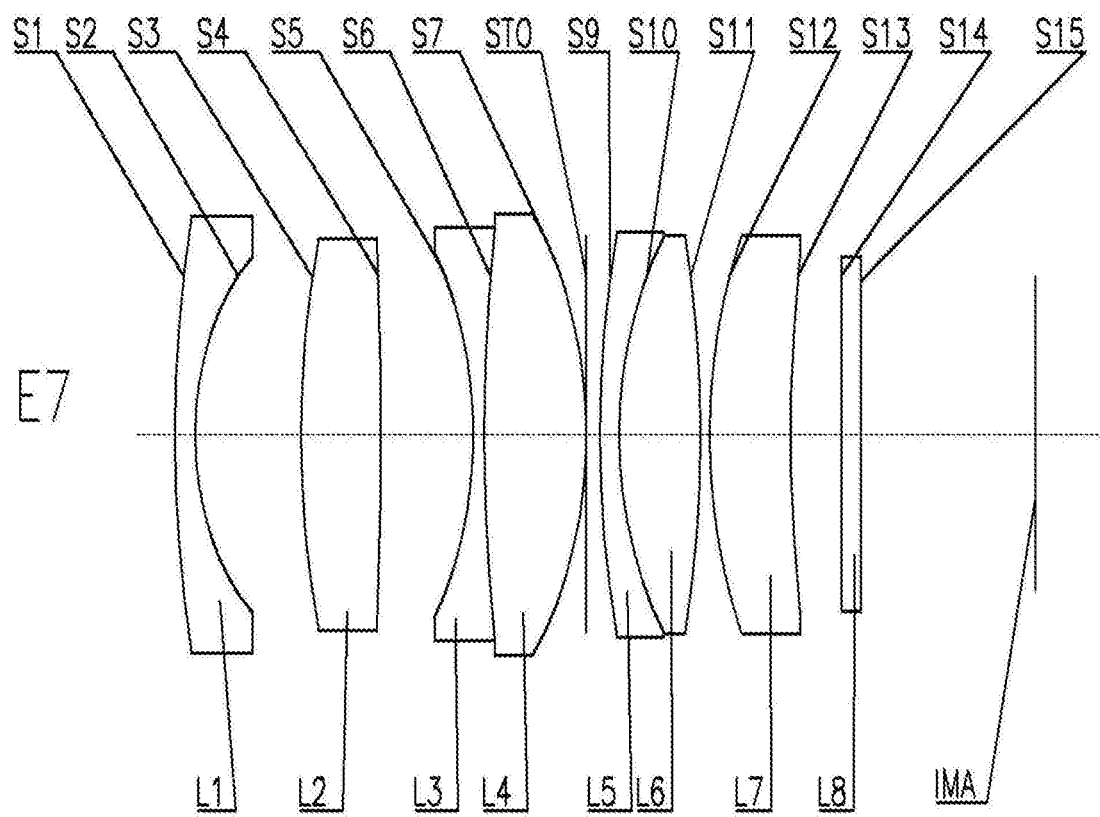
FIG. 7 is a schematic structural diagram showing an optical lens assembly according to Example 7 of the present disclosure.

An optical lens assembly according to Example 7 of the present disclosure is described below with reference to FIG. 7. In the present example and the following examples, a description similar to Example 1 will be omitted for brevity. FIG. 7 shows a schematic structural diagram of the optical lens assembly according to Embodiment 7 of the present disclosure.

As shown in FIG. 7, the optical lens assembly includes a first lens L1, a second lens L2, a third lens L3, a fourth lens L4, a fifth lens L5, a sixth lens L6, and a seventh lens L7, which are arranged sequentially along an optical axis from an object side to an imaging side of the optical lens assembly.

The first lens L1 is a meniscus lens having a negative refractive power, and an object-side surface S1 thereof is convex and an image-side surface S2 thereof is concave.

The second lens L2 is a biconvex lens having a positive refractive power, and both an object-side surface S3 and an image-side surface S4 thereof are convex.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a meniscus lens having a negative refractive power, and an object-side surface S9 thereof is convex and an image-side surface S10 thereof is concave. The sixth lens L6 is a biconvex lens having a positive refractive power, and both an object-side surface S10 and an image-side surface S11 thereof are convex. The fifth lens L5 and the sixth lens L6 are cemented to each other to form a second cemented lens.

The seventh lens L7 is a meniscus lens having a positive refractive power, and an object-side surface S12 thereof is convex and an image-side surface S13 thereof is concave.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 13 below shows the radius of curvature R, the thickness T, the refractive index Nd, and the Abbe number Vd of each lens of the optical lens assembly of Example 7, wherein the radius of curvature R and the thickness T are each in units of millimeters (mm). Table 14 below shows the maximum field-of-view FOV of the optical lens assembly, the total focal length F of the optical lens assembly, the image height H corresponding to the maximum field-of-view of the optical lens assembly, the total optical length TTL of the optical lens assembly, the maximum through aperture D of the object-side surface S1 of the first lens L1 corresponding to the maximum field-of-view of the optical lens assembly, the optical back focal length BFL of the optical lens assembly, the lens group length TL of the optical lens assembly, the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 7.

TABLE 13

| Surface No. | Radius of curvature R | Thickness T | Refractive index Nd | Abbe number Vd |
|---|---|---|---|---|
| 1 | 30.0000 | 1.0000 | 1.77 | 49.61 |
| 2 | 7.0440 | 5.1501 | | |
| 3 | 22.2922 | 4.0000 | 1.77 | 49.61 |
| 4 | −89.3116 | 4.5575 | | |
| 5 | −9.7440 | 0.5000 | 1.78 | 25.72 |
| 6 | 40.0000 | 5.0000 | 1.80 | 46.57 |
| 7 | −10.6633 | 0.0000 | | |
| STO | Infinite | 0.6363 | | |
| 9 | 23.9850 | 1.0000 | 1.78 | 25.72 |
| 10 | 10.0000 | 4.0000 | 1.50 | 81.59 |
| 11 | −26.6642 | 0.4188 | | |
| 12 | 13.3223 | 4.0000 | 1.77 | 49.61 |
| 13 | 35.0000 | 1.0000 | | |
| 14 | Infinite | 0.9500 | 1.52 | 64.21 |
| 15 | Infinite | 10.0714 | | |
| IMA | Infinite | / | | |

TABLE 14

| FOV (°) | 60 | d45 (mm) | 0.6363 |
|---|---|---|---|
| F (mm) | 7.8059 | F3 (mm) | −10.2611 |
| H (mm) | 7.8220 | F4 (mm) | 11.1127 |
| TTL (mm) | 42.2843 | F2 (mm) | 23.8849 |
| D (mm) | 13.7902 | R2 (mm) | 7.0440 |
| BFL (mm) | 12.0214 | R3 (mm) | 22.2922 |
| TL (mm) | 30.2628 | | |
| ENPD (mm) | 6.0046 | | |
| F7 (mm) | 26.2631 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=59.877°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.029. The optical total length TTL of the optical lens assembly and the total focal length F of the optical lens assembly satisfy TTL/F=5.417. The optical back focal length BFL of the optical lens assembly and the lens group length TL of the optical lens assembly satisfy BFL/TL=0.397. The entrance pupil diameter ENPD of the optical lens assembly and the optical total length TTL of the optical lens assembly satisfy ENPD/TTL=0.142. The focal length F7 of the seventh lens L7 and the total focal length F of the optical lens assembly satisfy F7/F=3.365. The center distance d45 between the image-side surface S7 of the fourth lens L4 and the object-side surface S9 of the fifth lens L5 and the optical total length TTL of the optical lens assembly satisfy d45/TTL=0.015. The focal length F3 of the third lens L3 and the focal length F4 of the fourth lens L4 satisfy |F3/F4|=0.923. The focal length F2 of the second lens L2 and the total focal length F of the optical lens assembly satisfy F2/F=3.060. The center radius of curvature R2 of the image-side surface S2 of the first lens L1 and the center radius of curvature R3 of the object-side surface S3 of the second lens L2 satisfy |(R2−R3)/(R2+R3)|=0.520.

Example 8

Figure 8:
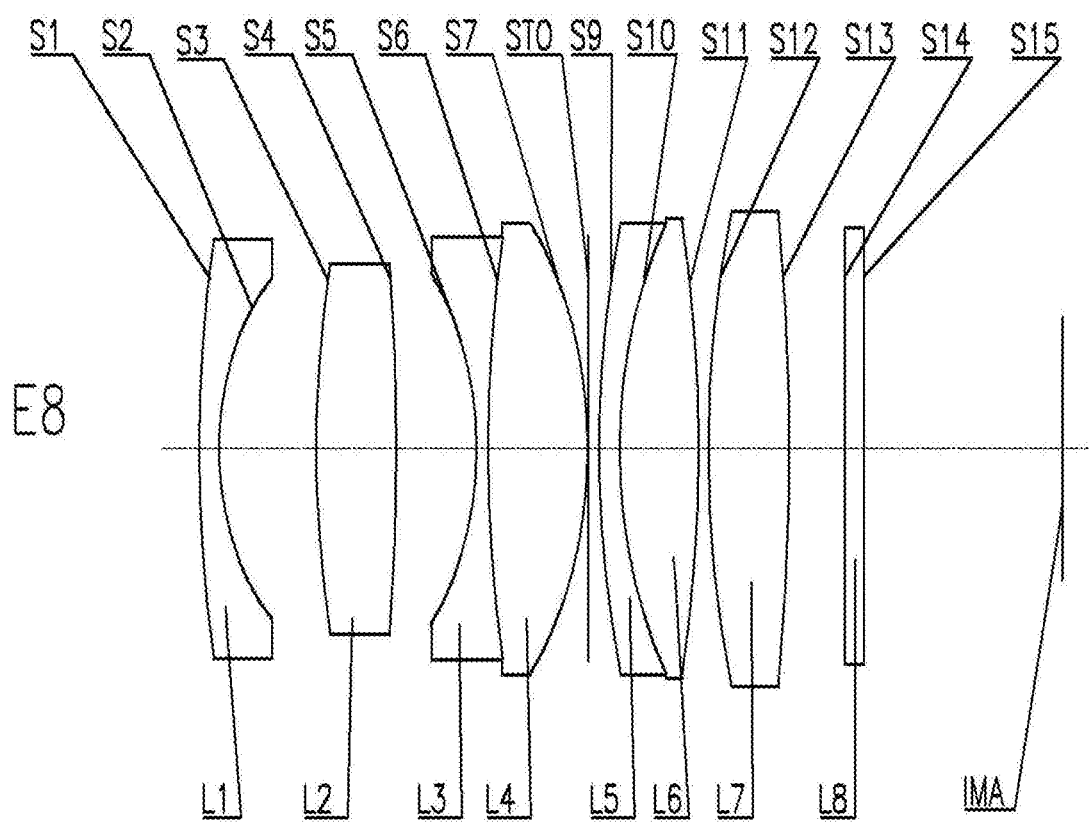
FIG. 8 is a schematic structural diagram showing an optical lens assembly according to Example 8 of the present disclosure.

An optical lens assembly according to Example 8 of the present disclosure is described below with reference to FIG. 8. In the present example and the following examples, a description similar to Example 1 will be omitted for brevity. FIG. 8 shows a schematic structural diagram of an optical lens assembly according to an Example 8 of the present disclosure.

As shown in FIG. 8, the optical lens assembly includes a first lens L1, a second lens L2, a third lens L3, a fourth lens L4, a fifth lens L5, a sixth lens L6, and a seventh lens L7, which are arranged sequentially along an optical axis from an object side to an imaging side of the optical lens assembly.

The first lens L1 is a meniscus lens having a negative refractive power, and an object-side surface S1 thereof is convex and an image-side surface S2 thereof is concave.

The second lens L2 is a biconvex lens having a positive refractive power, and both an object-side surface S3 and an image-side surface S4 thereof are convex.

The third lens L3 is a biconcave lens having a negative refractive power, and both an object-side surface S5 and an image-side surface S6 thereof are concave. The fourth lens L4 is a biconvex lens having a positive refractive power, and both an object-side surface S6 and an image-side surface S7 thereof are convex. The third lens L3 and the fourth lens L4 are cemented to each other to form a first cemented lens.

The fifth lens L5 is a meniscus lens having a negative refractive power, and an object-side surface S9 thereof is convex and an image-side surface S10 thereof is concave. The sixth lens L6 is a biconvex lens having a positive refractive power, and both an object-side surface S10 and an image-side surface S11 thereof are convex. The fifth lens L5 and the sixth lens L6 are cemented to each other to form a second cemented lens.

The seventh lens L7 is a biconvex lens having a positive refractive power, and both an object-side surface S12 and an image-side surface S13 thereof are convex.

Optionally, the optical lens assembly may further include a filter L8 and/or a protective lens L8' having an object-side surface S14 and an image-side surface S15. The filter L8 may be used to correct color deviations. The protective lens L8' can be used to protect the image sensing chip located on the imaging plane IMA. The light from an object sequentially passes through the respective surfaces S1 to S15 and is finally imaged on the imaging plane IMA.

In the optical lens assembly of the present example, a stop STO may be provided between the fourth lens L4 and the fifth lens L5 (i.e., between the first cemented lens and the second cemented lens) to improve the imaging quality.

Table 15 below shows the radius of curvature R, the thickness T, the refractive index Nd, and the Abbe number Vd of each lens of the optical lens assembly of Example 8, wherein the radius of curvature R and the thickness T are each in units of millimeters (mm). Table 16 below shows the maximum field-of-view FOV of the optical lens assembly, the total focal length F of the optical lens assembly, the image height H corresponding to the maximum field-of-view of the optical lens assembly, the total optical length TTL of the optical lens assembly, the maximum through aperture D of the object-side surface S1 of the first lens L1 corresponding to the maximum field-of-view of the optical lens assembly, the optical back focal length BFL of the optical lens assembly, the lens group length TL of the optical lens assembly, the entrance pupil diameter ENPD of the optical lens assembly, the focal length F7 of the seventh lens L7, the center distance d45 between the image-side surface S7 of the fourth lens L4 and the object-side surface S9 of the fifth lens L5, the focal lengths F2 to F4 of the second lens L2 to the fourth lens L4, the center radius of curvature R2 of the image-side surface S2 of the first lens L1, and the center radius of curvature R3 of the object-side surface S3 of the second lens L2 in Example 8.

TABLE 15

| Surface No. | Radius of curvature R | Thickness T | Refractive index Nd | Abbe number Vd |
|---|---|---|---|---|
| 1 | 30.0000 | 1.0000 | 1.77 | 49.61 |
| 2 | 6.7959 | 4.7886 | | |
| 3 | 24.4196 | 4.0000 | 1.77 | 49.61 |
| 4 | −51.4318 | 4.0000 | | |
| 5 | −7.8274 | 0.5000 | 1.78 | 25.72 |
| 6 | 30.0000 | 5.0000 | 1.80 | 46.57 |
| 7 | −10.2549 | 0.0000 | | |
| STO | Infinite | 0.5363 | | |
| 9 | 24.2709 | 1.0000 | 1.78 | 25.72 |
| 10 | 12.0000 | 4.0000 | 1.50 | 81.59 |
| 11 | −31.1862 | 0.4188 | | |
| 12 | 25.0000 | 4.0000 | 1.77 | 49.61 |
| 13 | −50.0000 | 1.0000 | | |
| 14 | Infinite | 0.9500 | 1.52 | 64.21 |
| 15 | Infinite | 11.5891 | | |
| IMA | Infinite | / | | |

TABLE 16

| FOV (°) | 60 | d45 (mm) | 0.5363 |
|---|---|---|---|
| F (mm) | 7.6753 | F3 (mm) | −8.1186 |
| H (mm) | 7.6420 | F4 (mm) | 10.2506 |
| TTL (mm) | 42.7828 | F2 (mm) | 22.3344 |
| D (mm) | 13.1402 | R2 (mm) | 6.7959 |
| BFL (mm) | 13.5391 | R3 (mm) | 24.4196 |
| TL (mm) | 29.2437 | | |
| ENPD (mm) | 5.9041 | | |
| F7 (mm) | 22.4870 | | |

In the present example, the maximum field-of-view FOV of the optical lens assembly, the total focal length F of the optical lens assembly, and the image height H corresponding to the maximum field-of-view of the optical lens assembly satisfy (FOV×F)/H=60.261°. The maximum field-of-view FOV of the optical lens assembly, the maximum through aperture D of the object-side surface S1 of the first lens L1 corresponding to the maximum field-of-view of the optical lens assembly, and the image height H corresponding to the maximum field-of-view of the optical lens assembly satisfy D/H/FOV=0.029. The optical total length TTL of the optical lens assembly and the total focal length F of the optical lens assembly satisfy TTL/F=5.574. The optical back focal length BFL of the optical lens assembly and the lens group length TL of the optical lens assembly satisfy BFL/TL=0.463. The entrance pupil diameter ENPD of the optical lens assembly and the optical total length TTL of the optical lens assembly satisfy ENPD/TTL=0.138. The focal length F7 of the seventh lens L7 and the total focal length F of the optical lens assembly satisfy F7/F=2.930. The center distance d45 between the image-side surface S7 of the fourth lens L4 and the object-side surface S9 of the fifth lens L5 and the optical total length TTL of the optical lens assembly satisfy d45/TTL=0.013. The focal length F3 of the third lens L3 and the focal length F4 of the fourth lens L4 satisfy |F3/F4|=0.792. The focal length F2 of the second lens L2 and the total focal length F of the optical lens assembly satisfy F2/F=2.910. The center radius of curvature R2 of the image-side surface S2 of the first lens L1 and the center radius of curvature R3 of the object-side surface S3 of the second lens L2 satisfy |(R2−R3)/(R2+R3)|=0.565.

In view of the above, Examples 1 to 8 satisfy the relationships shown in Table 17 below, respectively.

TABLE 17

| | Example | | | |
|---|---|---|---|---|
| Conditional | E1 | E2 | E3 | E4 |
| (FOV × F)/H | 65.014 | 62.219 | 61.072 | 61.799 |
| D/H/FOV | 0.031 | 0.032 | 0.029 | 0.031 |
| TTL/F | 5.481 | 5.336 | 5.540 | 5.628 |
| BFL/TL | 0.352 | 0.310 | 0.422 | 0.383 |
| ENPD/TTL | 0.146 | 0.150 | 0.139 | 0.137 |
| F7/F | 3.509 | 2.241 | 3.784 | 2.917 |
| d45/TTL | 0.014 | 0.014 | 0.014 | 0.015 |
| F3/F4 | 1.025 | 1.075 | 1.000 | 0.949 |
| F2/F | 2.659 | 2.491 | 3.378 | 3.026 |
| |(R2 − R3)/(R2 + R3)| | 0.415 | 0.408 | 0.398 | 0.336 |

| | Example | | | |
|---|---|---|---|---|
| Conditional | E5 | E6 | E7 | E8 |
| (FOV × F)/H | 62.032 | 61.623 | 59.877 | 60.261 |
| D/H/FOV | 0.029 | 0.027 | 0.029 | 0.029 |
| TTL/F | 5.540 | 5.552 | 5.417 | 5.574 |
| BFL/TL | 0.450 | 0.560 | 0.397 | 0.463 |
| ENPD/TTL | 0.144 | 0.139 | 0.142 | 0.138 |
| F7/F | 2.804 | 2.592 | 3.365 | 2.930 |
| d45/TTL | 0.015 | 0.015 | 0.015 | 0.013 |
| F3/F4 | 0.816 | 0.816 | 0.923 | 0.792 |
| F2/F | 2.531 | 2.631 | 3.060 | 2.910 |
| |(R2 − R3)/(R2 + R3)| | 0.400 | 0.483 | 0.520 | 0.565 |

The present disclosure further provides an imaging device that may include an optical lens assembly according to the above-described embodiments of the present disclosure and an imaging element for converting an optical image formed by the optical lens assembly into an electrical signal. The imaging element may be a Charge-Coupled Device element (CCD) or a Complementary Metal-Oxide Semiconductor element (CMOS). The imaging device may be an independent imaging device such as a range detection camera, or an imaging module integrated on a device such as a range detection device.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, consisting of: a first lens, a second lens, a third lens, a fourth lens, a fifth lens, a sixth lens, and a seventh lens, which are arranged sequentially from an object side to an image side of the optical lens assembly along an optical axis,
   wherein,
   the first lens has a negative refractive power, and an image-side surface of the first lens is concave;
   the second lens has a positive refractive power, and an object-side surface of the second lens is convex;
   the third lens has a negative refractive power, and each of an object-side surface and an image-side surface of the third lens is concave;
   the fourth lens has a positive refractive power, and each of an object-side surface and an image-side surface of the fourth lens is convex;
   the seventh lens has a positive refractive power, and an object-side surface of the seventh lens is convex; and
   a maximum field-of-view FOV of the optical lens assembly, a total focal length F of the optical lens assembly, and an image height H corresponding to the maximum field-of-view of the optical lens assembly satisfy (FOV×F)/H≥45°.

2. The optical lens assembly according to claim 1, wherein the fifth lens has a positive refractive power, and each of an object-side surface and an image-side surface of the fifth lens is convex; and
   the sixth lens has a negative refractive power, and an object-side surface of the sixth lens is concave and an image-side surface of the sixth lens is convex.

3. The optical lens assembly according to claim 1, wherein the fifth lens has a negative refractive power, and an object-side surface of the fifth lens is convex and an image-side surface of the fifth lens is concave; and
   the sixth lens has a positive refractive power, and each of an object-side surface and an image-side surface of the sixth lens are convex.

4. The optical lens assembly according to claim 1, wherein the third lens and the fourth lens are cemented to each other to form a first cemented lens, and
   wherein the fifth lens and the sixth lens are cemented to each other to form a second cemented lens.

5. The optical lens assembly according to claim 1, wherein the maximum field-of-view FOV of the optical lens assembly, a maximum through aperture D of an object-side surface of the first lens corresponding to the maximum field-of-view of the optical lens assembly, and the image height H corresponding to the maximum field-of-view of the optical lens assembly satisfy D/H/FOV≤0.07.

6. The optical lens assembly according to claim 1, wherein an optical total length TTL of the optical lens assembly and the total focal length F of the optical lens assembly satisfy TTL/F≤7.

7. The optical lens assembly according to claim 1, wherein an optical back focal length BFL of the optical lens assembly and a lens group length TL of the optical lens assembly satisfy BFL/TL≥0.25.

8. The optical lens assembly according to claim 1, wherein an entrance pupil diameter ENPD of the optical lens assembly and a total optical length TTL of the optical lens assembly satisfy ENPD/TTL≥0.05.

9. The optical lens assembly according to claim 1, wherein a focal length F7 of the seventh lens and the total focal length F of the optical lens assembly satisfy F7/F≤4.5.

10. The optical lens assembly according to claim 1, wherein a center distance d45 between an image-side surface of the fourth lens and an object-side surface of the fifth lens and an optical total length TTL of the optical lens assembly satisfy 0.005≤d45/TTL≤0.035.

11. The optical lens assembly according to claim 1, wherein a focal length F3 of the third lens and a focal length F4 of the fourth lens satisfy $0.3 \leq |F3/F4| \leq 1.7$.

12. The optical lens assembly according to claim 1, wherein a focal length F2 of the second lens and the total focal length F of the optical lens assembly satisfy $F2/F \leq 4.5$.

13. The optical lens assembly according to claim 1, wherein a center radius of curvature R2 of the image-side surface of the first lens and a center radius of curvature R3 of the object-side surface of the second lens satisfy $|(R2-R3)/(R2+R3)| \leq 1.5$.

14. The optical lens assembly according to claim 1, wherein
- the third lens and the fourth lens are cemented to each other to form a first cemented lens;
- the fifth lens and the sixth lens are cemented to each other to form a second cemented lens; and
- a total optical length TTL of the optical lens assembly and the total focal length F of the optical lens assembly satisfy $TTL/F \leq 7$.

15. The optical lens assembly according to claim 14, wherein the maximum field-of-view FOV of the optical lens assembly, a maximum through aperture D of an object-side surface of the first lens corresponding to the maximum field-of-view of the optical lens assembly, and the image height H corresponding to the maximum field-of-view of the optical lens assembly satisfy $D/H/FOV \leq 0.07$.

16. An imaging apparatus, comprising the optical lens assembly according to claim 1, and an imaging element for converting an optical image formed by the optical lens assembly into an electrical signal.

\* \* \* \* \*